United States Patent

[11] 3,602,019

[72] Inventor Kenichi Kazaoka
 Kariya-shi, Japan
[21] Appl. No. 838,125
[22] Filed July 1, 1969
[45] Patented Aug. 31, 1971
[73] Assignee Aisin Seiki Kabushiki Kaisha
 Kariya, Japan

[54] DOOR-LOCKING ARRANGEMENT FOR AUTOMOTIVE VEHICLE
 7 Claims, 8 Drawing Figs.
[52] U.S. Cl. .................................................... 70/264, 292/216
[51] Int. Cl. ..................................................... E05b 65/36, E05b 65/38
[50] Field of Search .......................................... 70/264

[56] References Cited
UNITED STATES PATENTS
2,934,930  5/1960  Garvey ......................... 70/264
3,084,757  4/1963  Oishel et al. .................. 70/264 X Primary Examiner—Albert G. Craig, Jr.
Attorney—Pierce, Scheffler & Parker ABSTRACT: A locking arrangement for the automotive vehicle doors in which a manipulating means is connected with a locking means in a disengageable connection normally engaged for moving said locking means from the locked position to the unlocked position, or vice versa, as required. The locking means moves together with the manipulating means until the locking or unlocking is completed. After the locking or unlocking is accomplished, the manipulating means can continue further movement for the sake of operating a switching means to connect an energy source with an automatic locking means, leaving the locking means in the locked or unlocked position.

PATENTED AUG 31 1971

INVENTOR
Kenichi Kazaoka
BY
Pierce, Scheffler & Parker
ATTORNEYS

DOOR-LOCKING ARRANGEMENT FOR AUTOMOTIVE VEHICLE

BACKGROUND OF THE INVENTION

This invention relates to a latch lock for an automotive vehicle.

As used herein, the term "locking means" refers to the means which enables the inside door handle or outside door handle to permit or prevent the latch to be moved relative to the striker plate on the door jamb. The term "manipulating means" refers to a means which is used to direct the locking means to act either to lock or unlock the door.

It is the primary object of the present invention to provide a single control for a vehicle door locking system which, in combination with an electrical switching means operative by a mere excessive movement of a manipulating means, provides automatic locking of all the selected doors in the vehicle.

A further object of the present invention is to provide a latch lock which is readily adaptable to a simple and economical conversion by combination with an electrical switching means which is actuated by a simple movement of the manipulating means for providing an automatic locking of all of the selected doors in the vehicle.

In addition to simplifying the latch lock, the invention greatly reduces not only the number of parts of the assembly but provides a latch lock, in which the installation of the forgoing components in the vehicle door is an easy matter and therefore low in labor cost when the vehicle is still stripped during the building thereof. The single control of the present invention is introduced into a system wherein the normal vehicle latch locks of the doors are coupled to fluid pressure motors or magnetic solenoids.

In the latch lock, the manipulative means and the locking means are in a disengageable connection normally engaged for moving said locking means from the locked position to the unlocked position, or vice versa, as required. The locking means moves together with the manipulating means until the locking or unlocking is accomplished. After the locking or unlocking is accomplished, the manipulating means can continue further its movement for operation of a switching means to connect an energy source with an automatic lock-actuating means, leaving the locking means in the locked or unlocked position.

The locking means of the present invention may involve those types of locking means which bring the inside or outside door handle into disengageable connection with the latching member as well as those locking means which prevents the action transmitted from the inside or outside door handle to be transmitted to the latching means.

Further, any type of inside or outside door handle may be used for the latch lock of the invention, so long as the engageable and disengageable relation is ensured relative to the latching member.

Still further, the disengageable connection which is normally engaged which the locking means may involve any connection so long as the locking means can be moved until the locking means accomplishes its locking or unlocking action and the manipulating means can move further to actuate the switching means while the locking means remains in its locked position or unlocked position.

Although a flexible member is ordinarily used for the purpose of the disengageable and normally engaged connection, between the manipulating means and the locking means by reason of the fact that the restoring function of the manipulating means is beneficially obtained when the manipulation for the switching means is accomplished and the operator ceases his manipulating action, such restoring function is not always required. This will be found in the description hereinbelow in greater detail.

In the instance that a fluid pressure is coupled with the latch lock of the present invention, a source of fluid pressure is provided, such as the engine manifold. Conduit means are provided between this source of fluid pressure, in this instance vacuum, and the fluid pressure motors associated with each of the vehicle doors. These conduit means include only a single conduit connection to each of the fluid pressure motors. A control valve exists in the above-described conduit means, restoring the vacuum transmitted to the motors after the automatic locking action has been terminated.

As long as the vehicle is moving, such vacuum can be obtainable for actuating the locking means. However, provision of a reservoir vacuum tank will suffice to attain such effect when the vehicle is brought to stop. In the instance where the fluid pressure motors are replaced by electric solenoids, the switch means is directly connected to the solenoids provided in each of the doors of the vehicle in association with each of the latch locks of the doors. In this instance, the automatic locking may be effected either when the vehicle is brought to stop, so long as the battery energy is available for the source of energy.

The present invention will be more fully understood when following portion of the specification are read in conjunction with the accompanying drawings wherein:

DESCRIPTION OF THE PREFERRED EMBODIMENT

Figure 1:
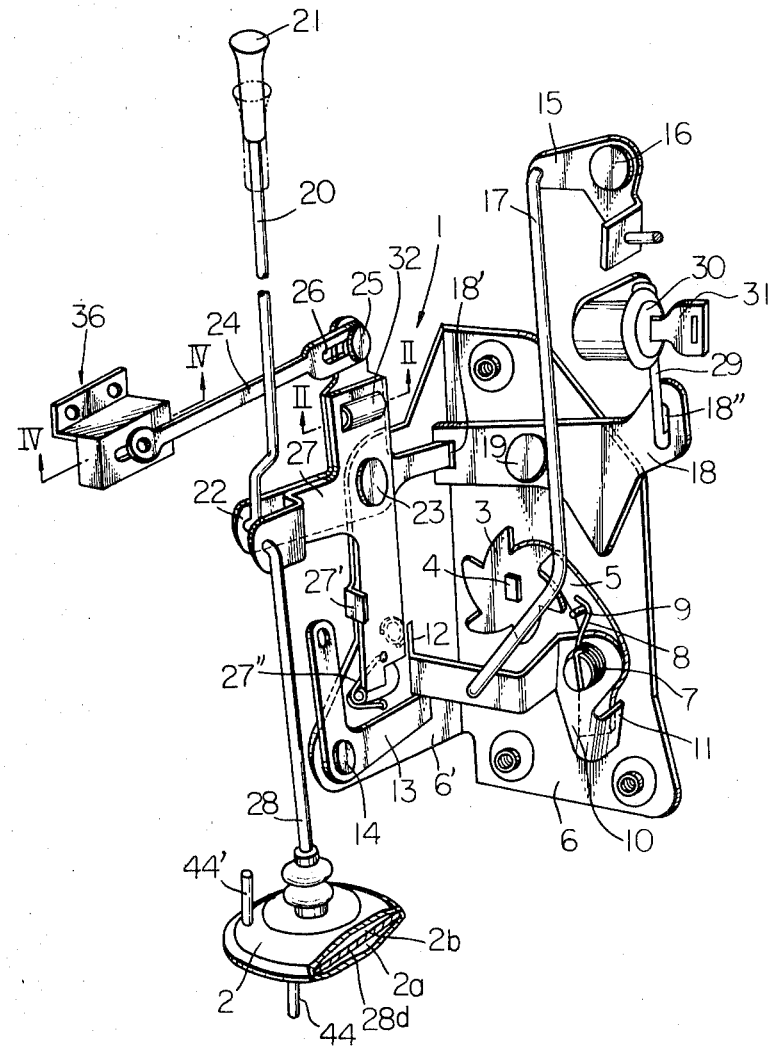
FIG. 1 is a perspective view of the door locking mechanism.

Referring now to FIG. 1, the latch lock which is actuated by a pneumatic motor 2, operates in a following manner.

Ratchet wheel 3 is mounted on shaft 4 on which a rotary door latch (not shown) is coaxially secured in engagement with the door striker plate (not shown) on the door jamb to lock or unlock the vehicle door. Pawl 5 is pivotally mounted on plate 6 by pin 7 so as to engage its end with the ratchet wheel 3 by the bias of spring 8 having one end anchored on pin 9 on the pawl 5 and the other end anchored in a slot of the pin 7 as illustrated so that pawl 5 is normally biased toward the ratchet teeth to be in engagement with the ratchet wheel 3. Bellcrank lever 10 is coaxially pivoted on pin 7 with pawl 5, at one end of which is a prong 11. The other end of the bellcrank lever 10 is fitted within slot 12 in plate 6 to permit pivoting thereof. Bellcrank lever 13 is pivotally mounted on the flange 6' of the plate 6 by pin 14, with being connected in abutment relationship the bellcrank lever 10 so as to be rotated by the lever 13 in a clockwise direction against the bias of spring 8 through the pawl 5, prong 11, and lever 10. The other leg of the bellcrank lever 13 is coupled to the conventional inside door handle (not shown) for manual unlocking. Bellcrank lever 15 is pivotally mounted on the molding (not shown) of the vehicle door by pin 16. One of the legs of the lever 15 is coupled to one end of rod 17 of which the other end is connected to lever 10 and, the other end of lever 15 being coupled to outside door handle (not shown) of the vehicle so that manual unlocking from outside the vehicle can be effected.

When the bellcrank lever 13 is rotated counterclockwise through an angle by manipulation of the inside door handle, the bellcrank lever 10 pivots together with the pawl 5 against the bias of the spring 8 in a clockwise direction about pin 7 and the ratchet wheel 3, that is the latch (not shown) coaxially secured on the shaft 4 is free to move relative to the striker plate (not shown) on the door jamb to permit the vehicle door to be pulled to an open position.

It will be seen that clockwise pivoting of the bellcrank lever 15 by manipulation of the outside door handle of the vehicle will cause the same action as is caused by the counterclockwise rotation of the lever 13. Lever 18 is pivotally mounted on plate 6 by pin 19. Shaft 20 of a conventional manual door locking and unlocking pin or nob 21 extends through the molding (not shown) of the vehicle door. Shaft 20 is fastened to one end of inverted T-shaped lever 22 adapted to pivot about pin 23, the other end of lever 22 fitting within notched recess 18' of lever 18. The other end of the inverted T-shaped lever 22 is coupled to connector 24 by pin 25 movably inserted within the elongated slot 26 at the end of the connector 24. A second lever 27 is coaxially pivoted with the lever 22 by pin 23, to one end of which is coupled shaft 28. The shaft 28 is fastened to diaphragm 28d which subdivides the chamber of the motor 2 shown in FIG. 1 into two chambers 2a and 2b. Swedged portion 27' of the flange 6' and the lever 10 define the range of rotation of the downwardly extending leg of the lever 27. Accordingly, reciprocation of the shaft 28 is limited within in the corresponding range of stroke.

One end of the lever 18 is coupled to rod 29 in a manner such that the end of the rod 29 can move within the elongated slot 18" of the lever 18. The other end of the rod 29 is coupled to the conventional key cylinder 30 so that the manipulation of the key cylinder with key 31 results in pivoting the lever 18 about pin 19. The length of the slot 18" is calculated so that the rod 29 may return a distance necessary to pull out the key after the locking is completed, leaving the lever 18 in such locked position.

The lever 22 and 27 are coaxially mounted on pin 23 as described above and are rotatable with respect to each other. Each of these levers is provided at a corresponding upper portion with opposed recesses 32 and 33 respectively, as shown in greater detail in sectional view of FIG. 2. In the chamber formed by combining these two opposed recesses, there is provided a compression spring 34, the force of the spring 34 being calculated sufficiently to bear the load imposed by the movement of the lever 22 for pivoting the lever 27 to the locked or unlocked position. After the rotation of lever 27 is stopped by the swedged portion 27' or lever 10, continued movement of the lever 22 causes retraction of the spring 34. When the lever 27 is rotated in a counterclockwise direction and the lower extremity end of the lever 27 abuts the upper edge of the lever 10, the lever 10 is thereafter prevented from rotating about the pin 7. Thus the ratchet wheel 3 is not free to rotate relative to the striker plate (not shown) on the door jamb to permit the vehicle door to be pulled to an open position and the door is locked. The snap acting spring 27" holds the lever 27 in such locked position. As long as the lever 27 stays in the locked position, any attempt to pull the door to an open position will fail, even though a force is applied through the outside door lever or inside door handle, i.e. through lever 15 or lever 13 respectively. When the lever 22 is pivoted in a clockwise direction, the lever 27 shifts its lower extremity end to the left in FIG. 1 and thus the above-described locking action is released, the lock becoming unlocked. The snap acting spring holds the lever 27 in the unlocked position. It is readily understood that above described action of the lever 27 is introduced either through the key cylinder 30 or the inside door nob 21. If either of them is excessively manipulated over the amount of movement required to lock the latch lock, the retraction of the spring 34 is brought about and the connector 24 is moved to the left or right in FIG. 1, as the case may be. Further continued movement of the lever 22 against the bias of the spring 34 will cause the pin 25 to move to the end of the elongated slot 26 of the connector 24 and will thence cause the sliding terminal 35 (FIG. 4) to be brought into contact with stationary terminal 37 or 38. As soon as the above-described locking manipulation has ceased, the lever 22 will return under the force of the spring 34 to its previous position where the locking lever 27 remains stationary.

Figure 2:
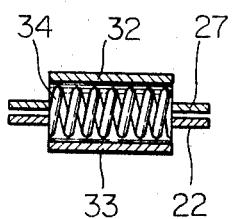
FIG. 2 is a sectional view taken along the line II—II of FIG. 1.

Such return motion is in turn accompanied by the restoring of the sliding terminal 35 to the position shown in FIG. 2 by the restoring force of the spring 34 and either of the spring 39a or 39b. The elongated slot 26 is calculated so as to allow the lever 22 to rotate sufficiently to complete the locking and unlocking while the connector 24 is in rest position and so as to cause the continued movement of the lever 22 to be accompanied by the movement of the connector 24.

Figure 8:
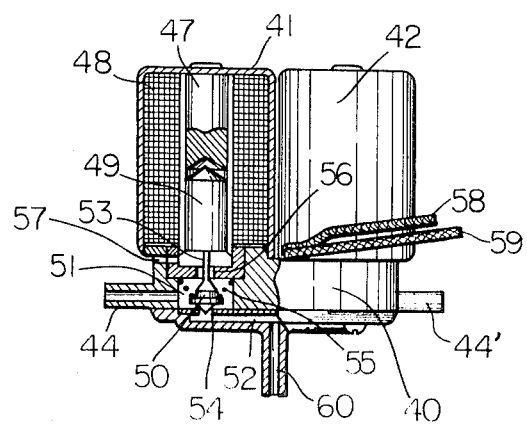
FIG. 8 is a partially cut away view of the control valve of the embodiment shown in FIG. 6.

In FIG. 8 is shown a control valve means 40 having solenoids 41 and 42 which includes magnetic coil 48, core 47, plunger 49 and valve 50. Since solenoid 42 has a construction identical with that of the solenoid 41, description of solenoid 42 is the same as that of the solenoid 41 as hereinbelow described. Conduits 44 and 44' leading from each of the chambers 2a and 2b of each of the motors 2 in the vehicle doors communicates with the chamber 52, conduit 60 leading from the vacuum source (not shown) communicating with the chamber 52. A valve 50 is affixed to the plunger 49 at the extremity end of the stem 53 of the valve 50 and is in rest condition when against seat 54 by spring 55. The chamber 52 communicates with atmospheric pressure through circumferential clearance between the stem 53 and seat 56 and inlet 57.

Incident to starting of the vehicle engine, the intake manifold will cause the evacuation of chamber 52 because conduit 60 communicates with said vacuum source. When a manipulating means such as key cylinder 30 is manipulated more than is required in the normal unlocked condition and in turn the sliding terminal 35 of the switch 36 is brought in contact with terminal 37, the solenoid 41 is energized. The valve 50 is thence unseated from seat 54 and each of the chambers 2a of each of the motors 2 will be evacuated through chamber 52 (FIG. 8) and also conduit 44 which is in communication with all of the chambers 2a. Since during the operation, the valve 50 engages with upper seat 56 and the communication of the chamber 51 with the atmospheric pressure is interrupted, the evacuation of the chamber 2a is not disturbed.

Figure 3:
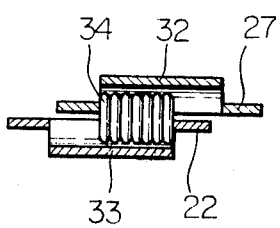
FIG. 3 is a similar view to FIG. 2 which shows a state when the manipulating means is in operation.
Figure 5:
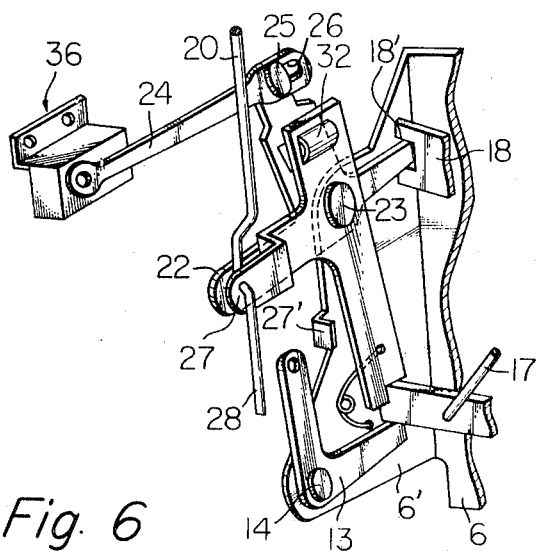
FIG. 5 is a perspective view of the latch lock as in FIG. 1 but with a portion removed.

The evacuation of the chamber 2a which is performed in the above described manner will result in the downward movement of diaphragm 28d mounted in the motor 2 with the corresponding downward movement of the shaft 28 affixed to said diaphragm. The downward movement of the shaft 28 will result in the rotation in a counterclockwise direction on the lever 27 and thus locking of the latch lock is effected as seen in FIG. 5. The lever is held in its locking position by the snap acting spring 27" which has its one end anchored in flange 6' and the other end in the lever 27 as shown in FIG. 5. The lever 27 is held in the unlocked position in the same way when the chamber 2b is communicated with the vacuum source. After the locking action is completed and as soon as the operator releases the key cylinder or nob as the case may be, the slidable terminal 35 of the switch 36 return to its first position under the urging of the spring 34 as shown in FIG. 2. FIG. 3 shows the state in which spring 34 is retracted by the greater movement of the lever 22 than the normal unlocking movement.

Figure 4:
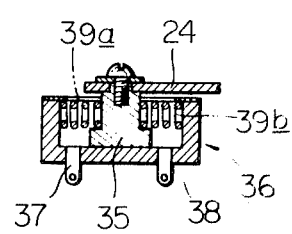
FIG. 4 is a sectional view taken along the line I–IO of FIG. 1.
Figure 6:
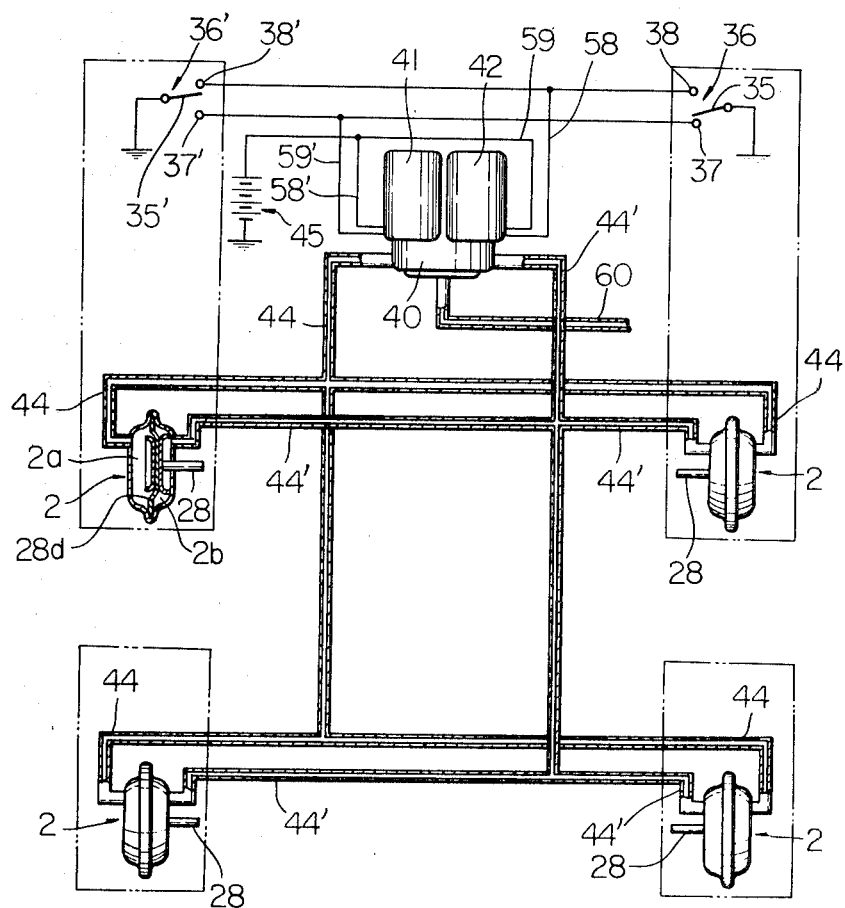
FIG. 6 is a diagrammatic view of the entire arrangement of the door locking system showing one embodiment of the present invention.

As soon as the slidable terminal 35 returns to the neutral rest position as shown in FIG. 4, the electrical circuit which has connected the solenoid 41 with battery 45 (FIG. 6) is opened and hence the valve 50 returns to its rest position as shown in FIG. 8. By such return of the valve 50, the chamber 2a communicates with the atmospheric pressure through conduit 44, chamber 51 and valve 50 unseats from the seat 56 so that both chambers 2a and 2b are returned to the atmospheric pressure thereafter.

It should be noted that the latch lock of the present invention is ordinarily provided in both driver's and front passenger's doors so that either of them can manipulate the latch lock.

It should be further noted that there is really no use as to the diaphragm 28d of the particular latch lock which is provided in the operator's door because the diaphragm is deflected by the movement of the lever 27 caused by the manipulation prior to the application of the vacuum pressure. Therefore, it will be said that the latch lock is used for the provision of automatic locking of the doors other than the operator's.

Accordingly, switch 36 is provided in the driver's door, while switch 36' is provided in the front passenger's door so that either of them can remotely control the other doors, namely when either of the switches is closed the automatic locking of the other doors will be effected.

Figure 7:
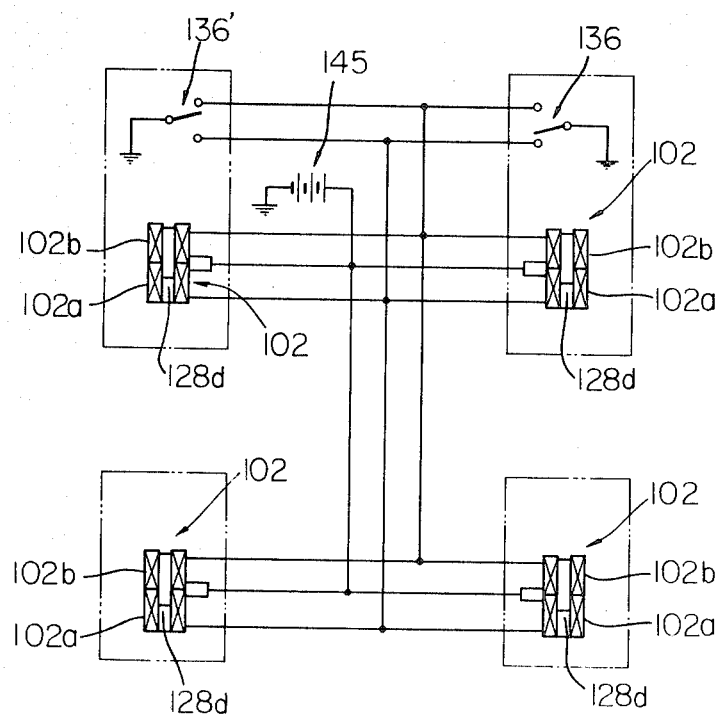
FIG. 7 is a view similar to FIG. 6 where solenoids are used for actuating the latch lock in another embodiment of the invention.

The above-described locking arrangement may be replaced by a full electrical magnetic arrangement as shown in FIG. 7. In the arrangement, the action of the solenoid 102a corresponds to that of the chamber 2a of the motor 2 and the action of solenoid 102b to that of the chamber 2b, iron armature 128d causing the same action caused by the diaphragm 28d of the motor.

Action and construction not specifically set forth in the above specification will be apparent to those who are skilled in the art by reasoning from the similar numerals having primes placed to the right thereof.

It will be found in the drawing that numerals 45, and 145, 36 and 136, 2, and 102 respectively refer to corresponding parts of different embodiments and numerals 58, 59 refer to wires which form electric circuits between the battery and the solenoids.

What is claimed is:

1. Door-locking arrangement for automotive vehicles comprising a plurality of mechanical latch means on each door, a plurality of motor means for operating said corresponding latch means, each latch means having a locking member movable between the locked and unlocked positions and a cooperating plate resiliently coupled therewith, each motor means operatively connected to its associated locking member, manipulating means on the door including a movable member inside the vehicle and a key member outside the vehicle, said plate being movable together with said locking member, and further movable by said manipulating means beyond the movable range of said locking member, a common energy source, a control valve for selective supply and interruption of supply of the energy from said energy source to said motor means, an electrical switching means for actuating said control valve, said plate being operatively connected both to said switching means and to said manipulating means, said switching means being actuated by said plate when any one of said manipulating means is operated to move said plate beyond the movable range of said locking member whereby said control valve is operated to act on each of said motor means.

2. Door-locking arrangement of claim 1 wherein said locking member and said plate are pivotally mounted on said mechanical latch and in back-to-back relationship to each other.

3. Door-locking arrangement of claim 1 wherein said plate is shaped as a substantially inverted T, a first leg thereof being connected to said movable member, a second leg thereof being connected to said key member, and a third leg thereof being connected to said switching means.

4. Door-locking arrangement of claim 1 wherein said locking member and said plate are provided with opposed recesses at corresponding portions thereof and further comprises resilient means housed in said opposed recesses.

5. Door-locking arrangement of claim 4 wherein said resilient means is a coil spring.

6. Door-locking arrangement of claim 1 wherein said motor means comprises a pneumatic means.

7. Door-locking arrangement of claim 1 wherein said motor means comprises electrically operated means.